United States Patent
Chang et al.

(10) Patent No.: US 9,906,413 B1
(45) Date of Patent: *Feb. 27, 2018

(54) SYSTEM AND METHOD FOR IMPLEMENTING A DYNAMIC HIERARCHY FOR DEVICES

(71) Applicant: JPMorgan Chase Bank, N.A., New York, NY (US)

(72) Inventors: Eric Han Kai Chang, Wilmington, DE (US); James Perry White, III, Middletown, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 386 days.

This patent is subject to a terminal disclaimer.

(21) Appl. No.: 14/574,824

(22) Filed: Dec. 18, 2014

(51) Int. Cl.
  *G06F 15/173* (2006.01)
  *H04L 12/24* (2006.01)
  *H04L 12/26* (2006.01)

(52) U.S. Cl.
  CPC .......... *H04L 41/12* (2013.01); *H04L 41/0866* (2013.01); *H04L 43/0847* (2013.01)

(58) Field of Classification Search
  CPC .......... H04L 41/0213; H04L 29/08072; H04L 29/06; H04L 41/22; H04L 41/12; H04L 43/00; H04L 12/2602; H04L 43/04; H04L 43/12; H04L 67/1097
  See application file for complete search history.

(56) References Cited

U.S. PATENT DOCUMENTS

| | | | |
|---|---|---|---|
| 6,532,481 B1 * | 3/2003 | Fassett, Jr. | ........ G06F 17/30067 |
| 7,805,369 B2 | 9/2010 | Song et al. | |
| 7,813,947 B2 | 10/2010 | DeAngelis et al. | |
| 7,882,031 B2 | 2/2011 | Song et al. | |
| 7,899,722 B1 | 3/2011 | Lawrence et al. | |
| 7,930,228 B1 | 4/2011 | Hawkins et al. | |
| 8,140,415 B2 | 3/2012 | Lawrence et al. | |
| 8,260,638 B2 | 9/2012 | McNamee et al. | |
| 8,543,444 B2 | 9/2013 | Agle et al. | |
| 8,589,260 B2 | 11/2013 | Chambers et al. | |
| 8,626,645 B1 | 1/2014 | Lazerson et al. | |
| 2002/0147690 A1 * | 10/2002 | Tam | ........ G06Q 20/12 705/64 |
| 2003/0131011 A1 | 7/2003 | Haunschild et al. | |
| 2003/0217036 A1 | 11/2003 | Haunschild et al. | |
| 2004/0150519 A1 * | 8/2004 | Husain | ........ G08B 13/19656 340/506 |
| 2005/0065904 A1 | 3/2005 | DeAngelis et al. | |

(Continued)

*Primary Examiner* — Abdullahi E Salad
(74) *Attorney, Agent, or Firm* — Hunton & Williams LLP (57) ABSTRACT

According to an embodiment of the present invention, an automated computer implemented system and method for building system hierarchies comprising: an input configured to receive monitoring data from a plurality of devices associated with an entity, wherein the monitoring data for each device of the plurality of devices comprises a unique addressing scheme, the unique addressing scheme comprising a location identifier, a relationship identifier and an object identifier for each device; a processor configured to dynamically build a system hierarchy based on the addressing scheme for each device responsive to the monitoring data and a calculated data determined for each device; and an output configured to generate the system hierarchy on an user interface.

19 Claims, 6 Drawing Sheets

(56) References Cited

U.S. PATENT DOCUMENTS

| | | | |
|---|---|---|---|
| 2005/0065941 A1 | 3/2005 | DeAngelis et al. | |
| 2006/0173759 A1 | 8/2006 | Green et al. | |
| 2007/0283002 A1* | 12/2007 | Bornhoevd | G06F 9/54 709/224 |
| 2008/0015913 A1 | 1/2008 | Courtney et al. | |
| 2008/0276127 A1* | 11/2008 | McFarland | G05B 19/0428 714/37 |
| 2009/0276347 A1* | 11/2009 | Kargman | G06Q 20/32 705/35 |
| 2010/0042535 A1* | 2/2010 | Stone | G06Q 20/10 705/39 |
| 2010/0138156 A1* | 6/2010 | Rubin-de-Cervens | G01C 21/3611 701/469 |
| 2010/0142535 A1* | 6/2010 | Swainston | H04L 12/2809 370/395.3 |
| 2010/0262467 A1* | 10/2010 | Barnhill, Jr. | H04L 12/2809 709/223 |
| 2011/0087576 A1 | 4/2011 | Song et al. | |
| 2011/0131125 A1 | 6/2011 | Lawrence et al. | |
| 2012/0303525 A1 | 11/2012 | Sahadevan | |
| 2013/0282920 A1* | 10/2013 | Zhang | H04L 45/74 709/238 |
| 2013/0290218 A1 | 10/2013 | Merwin et al. | |
| 2013/0332323 A1* | 12/2013 | Phillips | G06K 9/00771 705/28 |
| 2014/0143337 A1* | 5/2014 | McIntosh | H04L 67/02 709/204 |
| 2014/0317167 A1* | 10/2014 | Wahl | H04L 41/12 709/201 |
| 2015/0026642 A1* | 1/2015 | Wilson | G06F 3/0482 715/825 |
| 2015/0100600 A1* | 4/2015 | McGee | G06F 9/44505 707/770 |
| 2015/0103821 A1* | 4/2015 | Gilson | H04L 45/58 370/360 |
| 2016/0036764 A1* | 2/2016 | Dong | H04L 61/3025 370/254 |
| 2016/0092456 A1* | 3/2016 | Bonnell | G09B 29/10 707/724 |
| 2016/0094419 A1* | 3/2016 | Peacock | H04L 43/04 709/213 |

\* cited by examiner

Example Input

```
510 ─ {
512 ─   'address': 'BLD001.000000.UPS001',
        'key': 'kw',
        'value': '100'
514 ─ }
      {
        'address': 'ABC001.UPS001.PDU0001',
        'key': 'kw',
516 ─   'value': '100'
      },
      {
        'address': 'ABC001.PDU0001.RPP001',
        'key': 'kw',
        'value': '100'
      },
      {
        'address': 'ABC001.RPP001.BRK001',
        'key': 'kw',
        'value': '100'
      },
      {
        'address': 'ABC001.BRK001.STR0001',
        'key': 'kw',
        'value': '100'
      },
      {
        'address': 'ABC001.STR0001.PLG001',
        'key': 'kw',
        'value': '100'
      }
```

FIGURE 5

Example Output

```
{
610 ──── 'BLD001': {
           'reported_data': {
              'kw': 100,
              'kva': 100,
612        },
           'calculated_data': {
              'kw': 98,
              'kva': '100,
614           'amps': 100,
           },
           'children': {
616 ──── 'UPS001': {
              'reported_data': {
                 'kw': 100,
                 'kva': 100,
618           },
              'calculated_data': {
                 'kw': 98,
                 'kva': 100,
                 'amps': 100,
              },
              'children': {
                 'PDU0001': {
                    'reported_data': {
                       'kw': 100,
                       'kva': '100,
                    },
                    'calculated_data': {
                       'kw': 98,
                       'kva': 100,
                       'amps': 100,
                    }
                    'children': {
                       'RPP001': {
                          'reported_data': {
                             'kva': 100,
                          },
```

FIGURE 6

SYSTEM AND METHOD FOR IMPLEMENTING A DYNAMIC HIERARCHY FOR DEVICES

FIELD OF THE INVENTION

The present invention generally relates to device management and more specifically to a system and method for dynamically building system hierarchies from collected data in real-time.

BACKGROUND OF THE INVENTION

Resource planning is a complicated process that relies heavily on the accuracy of the data available. Oftentimes the data that is received is not entirely accurate and may be off by a relatively small amount. However, those minute differences can propagate throughout an entire system and result in inefficiencies and wasted resources. As data from lower devices roll up to parent devices, data quality issues caused by incorrect configuration can cascade across an entire dataset. This can make planning changes and managing capacity a very complicated and manual process. Data centers are typically unable to calculate essentially how much electricity is used at a minute level. Information is usually only available at an aggregate level in the form of a bill from an electric company, for example. Although data for individual devices may be collected, there is no mechanism to identify the relationships between two different pieces of hardware on a data center floor.

Other drawbacks may also be present.

SUMMARY OF THE INVENTION

Accordingly, one aspect of the invention is to address one or more of the drawbacks set forth above. According to an embodiment of the present invention, a system and method for building system hierarchies comprising: an input configured to receive monitoring data from a plurality of devices associated with an entity, wherein the monitoring data for each device of the plurality of devices comprises a unique addressing scheme, the unique addressing scheme comprising a location identifier, a relationship identifier and an object identifier for each device; a processor configured to dynamically build a system hierarchy based on the addressing scheme for each device responsive to the monitoring data and a calculated data determined for each device; and an output configured to generate the system hierarchy on an user interface.

In other exemplary embodiments, the preceding method may be performed using a system with a processor and a memory comprising computer-readable instructions which when executed by the processor cause the processor to perform the method steps.

These and other embodiments and advantages of the invention will become apparent from the following detailed description, taken in conjunction with the accompanying drawings, illustrating by way of example the principles of the various exemplary embodiments.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

FIG. 6 is an exemplary illustration of an output, according to an embodiment of the present invention.

DETAILED DESCRIPTION OF PREFERRED EMBODIMENTS

An embodiment of the present invention is directed to a system and method for dynamically building system hierarchies from collected data from a plurality of monitored devices.

An embodiment of the present invention is directed to a system and method that implements an addressing scheme that allows for dynamic creation of a device hierarchy, such as a building's power infrastructure device (PID) hierarchy. An embodiment of the present invention also provides automatic aggregation and annotation of related devices to other devices. For example, an annotation may relate child device values to parent devices. Other associations and affiliations may be captured. An exemplary addressing scheme of an embodiment of the present invention may be incorporated into existing environmental monitoring systems (at the PID level, for example) whose data may be applied to the system and method. According to an embodiment of the present invention, the system and method may dynamically construct the hierarchy of devices and perform calculations, aggregations, and/or annotations in real-time thereby resulting in a comprehensive hierarchal dataset representing data points in the system. The system and method of an embodiment of the present invention may accomplish this without the need for configuration and/or manual intervention. In addition, an embodiment of the present invention dynamically rebuilds the hierarchy as new data is introduced.

Successful management of a building's electrical environment requires a comprehensive understanding of how power is distributed, what power infrastructure devices (PIDs) are in use, how they are performing, and how these devices are related. The construction of this device hierarchy typically involves establishing relationships between PIDs.

An embodiment of the present invention is directed to associating a resource characteristic (e.g., power, water pressure, electricity, air pressure, air flow, etc.) with one device to the resource characteristic (same, similar and/or related resource characteristic) of another device and then perform analysis and calculations to identify what and/or how the resource is being used, consumed, provided and/or managed.

Figure 1:
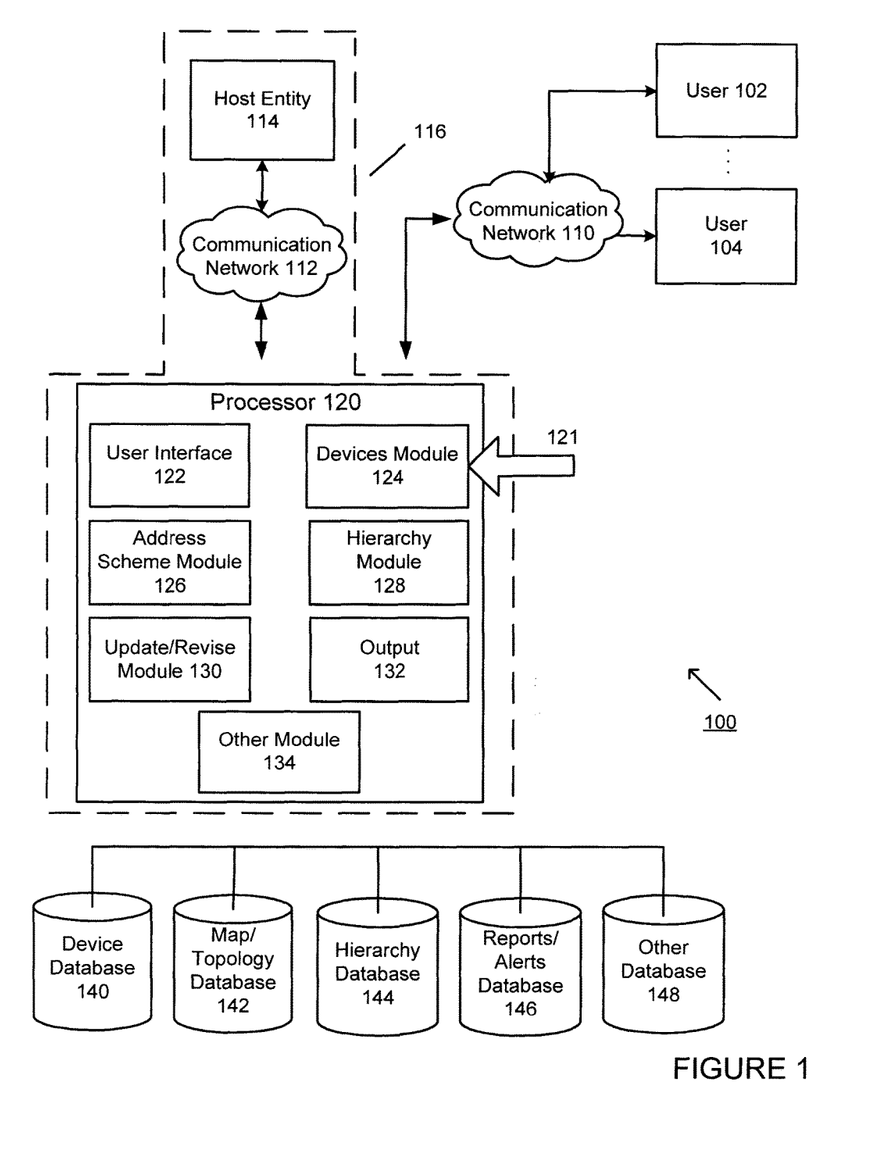
FIG. 1 is an exemplary detailed diagram of a system for dynamically building hierarchies, according to an embodiment of the present invention.

FIG. 1 is an exemplary detailed diagram of a system for dynamically building hierarchies, according to an embodiment of the present invention. A system 100 of an embodiment of the present invention may include a Processor 120. The Processor 120 may be available via a web interface or other user interface. As illustrated in FIG. 1, Processor 120 may be accessed by users, including engineers, system managers, executives, managers, finance managers, groups, divisions and/or other users via a communication device associated with a user. The user may establish a communication session with a communication device via a communication network 110. The communication device may be a computer, laptop, mobile device, phone, and/or any device that can communicate with another device.

Processor 120 may be stand alone or hosted by an entity, such as a financial institution, service provider, corporation, company, facility, merchant, bank, etc. For example, Processor 120 may be affiliated or associated with a host entity and/or other entity. In an exemplary embodiment involving a Host Entity 114 may host or support Processor 120. In this example, the generation of dynamic hierarchies of an embodiment of the present invention may appear to be performed by a host entity, as a single consolidated unit, as shown by 116. According to another example, Processor 120 may be separate and distinct from Host Entity 114. For example, Host Entity 114, or other entity, may communicate to Processor 120 via a network or other communication mechanism, as shown by Communication Network 112.

Processor 120 may access databases and/or other sources of information to perform calculations and analysis. Processor 120 may access and/or maintain Device Database 140, Map/Topology Database 142, Hierarchy Database 144, Reports/Alerts Database 146 and Other Database 148.

Device Database 140 may maintain information on equipment, devices, resources, usage, location, historical data and other device specific information. For example, this database may include information regarding connectivity, neighboring devices, links, system environments, information about nodes, etc.

Map/Topology Database 142 may include information relating to various topologies for various systems and networks. This database may also include information relating to layout, floor plans and may further include location of devices, connections, employees, contractors, equipment, resources, network elements, etc. Information on each floor, team or subset may also be available. This database may include information regarding specifics of the network, load, performance, demand, etc. This information may be specific for location, floor, team, etc.

Hierarchy Database 144 may maintain and manage hierarchies for each location and/or area. For example, one location may have multiple hierarchies that manage different resources, characteristics, factors, etc.

Reports/Alerts Database 146 may store reports as well as manage alerts and/or other schedules. Reports may be stored to perform system analysis, run statistics and perform prediction analysis. In addition, alerts may be programmed for various events, e.g., low power, over usage, replacement notice, etc.

While a single database is illustrated in the exemplary figure, the system may include multiple databases at the same location or separated through multiple locations. The databases may be further combined and/or separated. In addition, the databases may be supported by Host Entity 114 or an independent service provider. For example, an independent service provider may support the one or more databases and/or other functionality at a remote location. Other architectures may be realized. The components of the exemplary system diagrams may be duplicated, combined, separated and/or otherwise modified, as desired by various applications of the embodiments of the present invention as well as different environments and platforms.

Processor 120 may include various modules and interfaces for dynamically building system hierarchies, according to an embodiment of the present invention. Processor 120 may include User Interface 122, Devices Module 124, Address Scheme Module 126, Hierarchy Module 128, Update/Revise Module 130, Output 132 and/or other modules, interfaces and/or processors, as represented by Other Module 134. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

An embodiment of the present invention is directed to an addressing scheme that, once applied, allows for dynamic identification of a hierarchal structure of a data center's devices, e.g., power devices, etc. The addressing scheme provides the ability to understand relationships between the devices and may be applied without requiring a change in configuration on the data center floor. An embodiment of the present invention applies the addressing scheme to dynamically identify and aggregate the various relationships (e.g., children devices, parent devices, associated devices, affiliated devices, etc.) and be able to calculate and report power draw or any other environmental value draw at any point in the hierarchy. Also, an embodiment of the present invention may dynamically incorporate new data as it is reported and/or received in real-time.

According to another embodiment of the present invention, Processor 120 may host a website or other electronic interface where users may access data as well as provide data. For example, a user may submit and access information through User Interface 122 to view data, submit requests, provide data and/or perform other actions. Processor 120 may communicate with various entities via communication network 110. For example, Processor 120 may receive inputs from users, shown by 102 and 104.

Devices Module 124 identifies devices/objects within an area and/or system. Objects may be any component that produces and/or consumes a resource. For example, objects may include a Uninterruptable Power Supply (UPS) system, a power distribution unit, a circuit breaker, fan unit, air conditioning unit and/or other device relating to environmental use/usage. The devices may also be categorized by type, usage, location, etc. Devices Module 124 may also identify the user or users of the device. Also, an embodiment of the present invention may learn or otherwise identify how a particular device functions, operates, provides a resource, consumes a resource, interacts with another device, etc.

Devices Module 124 may also receive monitor data from various remote devices. The monitor data may include readings, measurements, status data, etc. The monitor data may be received via Input 121. The data may be received in real-time, batch mode, etc. via various forms of communication.

An embodiment of the present invention may assign priorities to certain types of device, associations, connections, sections, locations, areas, etc. For example, some devices may be considered operation mission critical. To a financial institution, the group of devices that process credit card transactions may be prioritized. The type of user may also impact the importance of the data. For example, the CEO and upper management as well as IT personal may be considered critical users. Priorities may be based on various factors and may be revised and/or updated based on events, projects, new product rollouts, schedules etc.

An embodiment of the present invention may consider privileges assigned to devices as well as users, employees, members or participants. For example, different members may be given priority over others. The devices associated with upper management may be given priority over other devices. Also, a company may assign employees different level of services, usage, etc.

Dynamic Address Scheme Module 126 generates and/or identifies a unique address assigned to each device/object within an area and/or system. The devices may be from a location as well as multiple locations, different entities, etc. According to an embodiment of the present invention, the unique address may comprise at least three components, which may include location identifier, parent object identifier and object identifier. Depending on the complexity of a system or application, additional identifiers may be implemented. Also, the identifiers may be combined. The location identifier may identify a specific location within an area or system. The parent object identifier may represent a parent device and/or other relationship with another device. The object identifier may represent an identifier for the specific object. Other variations may be implemented.

Hierarchy Module 128 may manage device hierarchies for a system, specified area, location, multiple locations, defined area, etc. The hierarchies may represent device relationships with other devices, system, components, users, locations, etc. The hierarchies may also be customized to illustrate various resources, features and/or functions. For example, a system may include multiple hierarchies, including a master hierarchy that illustrates all the devices, a power hierarchy that illustrates the power consuming devices (e.g., devices that consume over/below a threshold level of power, etc.), a water pressure hierarchy, a lighting hierarchy, a critical devices hierarchy, off-hours hierarchy, etc.

Update/Revise Module 130 may update and/or modify the device hierarchies based on new information or data. For example, if a low level device stops functioning, other associated and/or related devices may be adjusted accordingly. Also, if new devices are added, the hierarchies may be modified to incorporate the newly added devices. If a device is moved and/or otherwise modified, this move may affect other devices that may need to be updated.

Output 132 may generate reports, interfaces, analysis, etc. The output may be an interactive interface where a user may submit requests and perform analysis. The output may be provided to a mobile device, e.g., phone, tablet, laptop, computer, etc. The output may be send to multiple recipients via various modes of communication (e.g., email, text, voicemail, etc.). Each report generated may be stored, e.g., Reports/Alerts Database 146, etc. Also, alerts may be managed and/or programmed for certain events, such as when devices function in a certain manner, e.g., low power, overload, near overload, maintenance, etc.

Figure 2:
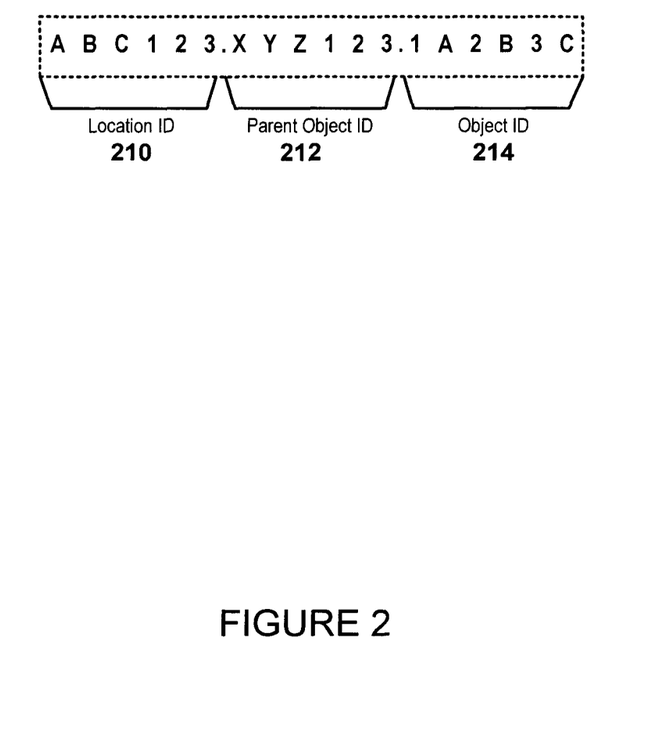
FIG. 2 is an exemplary illustration of an addressing scheme, according to an embodiment of the present invention.

FIG. 2 is an exemplary illustration of an addressing scheme, according to an embodiment of the present invention. The exemplary addressing scheme may include multiple sections. In this example, the addressing scheme includes three sections, namely Location ID 210, Parent Object 212 and Object ID 214.

An embodiment of the present invention may manage various objects within an entity, such as a corporation, business, store, location, etc. Objects may be any component, it may be a resource producing and/or resource consuming device. Examples may include a UPS system, a power distribution unit, a circuit breaker, fan unit, air conditioning unit and/or other device relating to environmental use/usage.

Location ID 210 may include universally unique identifier (UUID) of the location within a specified universe. Location may represent a logical or physical area or container with boundaries. In general, a location does not overlap with other locations and may be unique within an organization. The location ID is a simple representation of where in the specified universe these objects reside. The universe may be limited to a particular area, geographic location, city, state, region, country, etc. Also, the universe may be company specific, unit specific, e.g., entity, company location, unit, store location, etc. The universe may span across multiple locations, entities, etc.

Parent Object ID 212 may include a locally unique identifier (LUID) of a parent object. Parent Object ID represents a device's relationship and/or association with other devices. For example, an object may be a power distribution unit, and its parent may be a specific UPS. According to another example, an object may be a fan and its parent may be a specific cabinet in the data center. The parent object ID represents the object that the base object is dependent upon. There may be scenarios where a parent may not exist for a top-level object. In this case, the parent object ID may be represented by zeros or other place holder. According to an exemplary embodiment, the parent object ID represents an immediate parent. Even if there are multiple hierarchical levels, the parent object ID may represent the immediate parent not the ultimate parent. In an example of a multi-level hierarchy, an ultimate parent device will be identified at the top layer. Other variations may be implemented. For example, Parent Object ID may represent a relationship identifier, such as a child object identifier, peer object identifier, associated object identifier, etc.

Object ID 214 may include a locally unique identifier (LUID) of the object. An object may be any device. LUID locality may be the same as the parent device. Each part may be a series of numbers, letters, symbols, and/or various combinations thereof. For example, each part may be represented by a Base 36 number of characters in length, with the largest six character Base 36 number being ZZZZZZ. Other types of numbers, identifiers and/or symbols may be implemented. Object categorization may be achieved by assigning a Base 36 number range to represent a category or other characteristic or quality. For example, Range (000000-000ZZZ) corresponds to category A; Range (001000-00A000) corresponds to category B; and Range (00B000-000000) corresponds to category C. Other subdivisions may be applied. Also, similar subdivisions may be applied to UUIDs and/or LUIDs.

Figure 3:
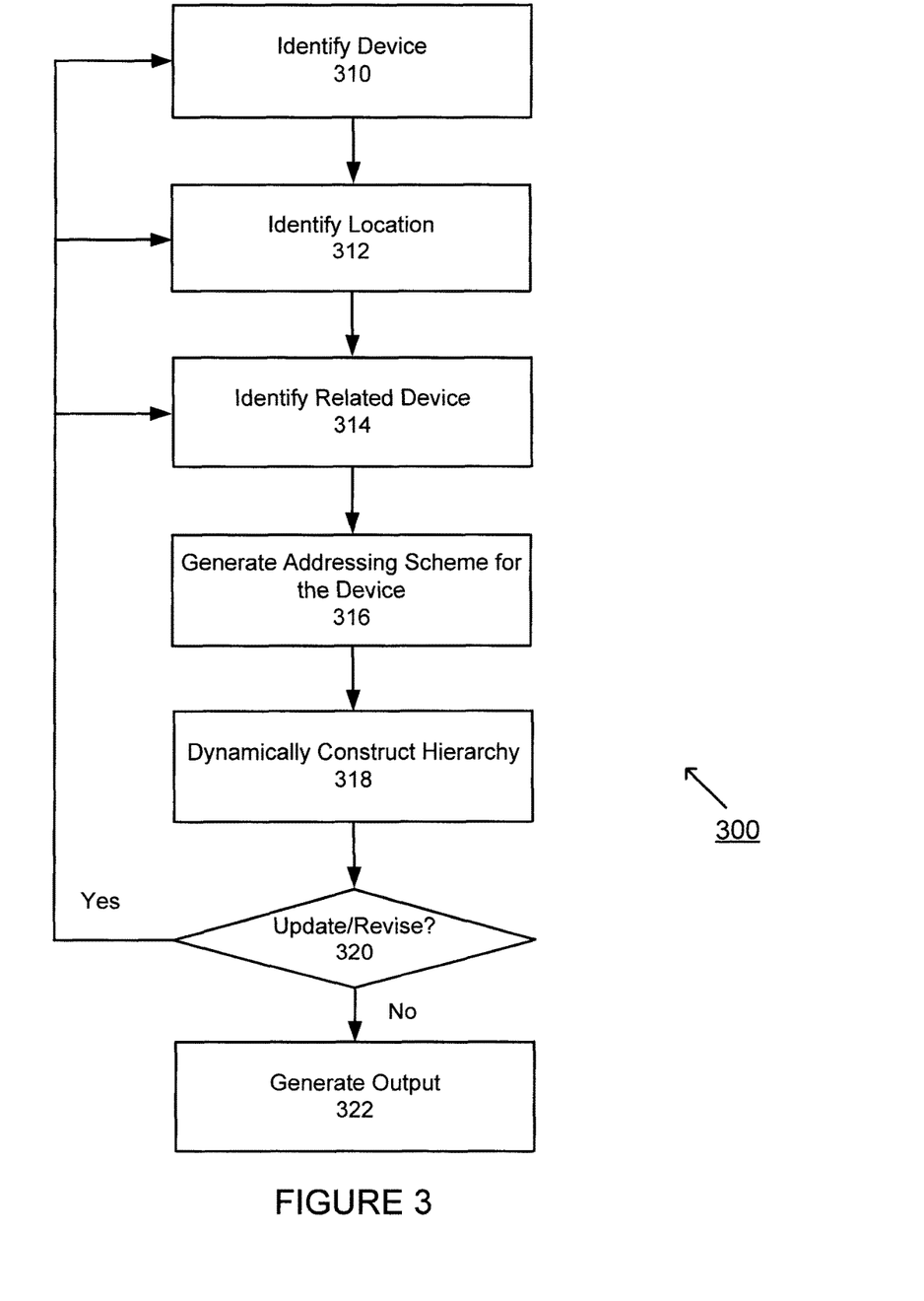
FIG. 3 is an exemplary illustration of a method for dynamically building system hierarchies, according to an embodiment of the present invention.

FIG. 3 is an exemplary illustration of a method for dynamically building system hierarchies, according to an embodiment of the present invention. At step 310, one or more devices may be identified. At step 312, a location of each device may be identified. At step 314, one or more related devices and corresponding associations may be identified. At step 316, an addressing scheme may be identified. At step 318, a hierarchy of devices may be dynamically constructed. At step 320, an update may be performed. At step 322, reports, alerts and/or other output may be generated. The order illustrated in FIG. 3 is merely exemplary. While the process of FIG. 3 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 310, one or more devices of a location or other area may be identified. A device identifier may be identified. At step 312, a location of each device may be identified. The location may identify a geographic area, e.g., building location, floor location, unit location, GPS coordinates, etc.

At step 314, one or more related devices and corresponding associations may be identified. Generally, a device may have a parent device, such as a controller, unit, etc. For example, a fan unit may feed to a control unit. For a larger location, multiple fans may feed to a control unit or multiple control units distributed across multiple locations.

At step 316, an addressing scheme may be identified. Using the information gathered, an addressing scheme may be identified for each device. The addressing scheme may comprise multiple sections. For example, the addressing scheme includes three sections, namely a location identifier, parent object identifier, and object identifier. Other variations may be implemented.

At step 318, a hierarchy of devices may be dynamically constructed. An embodiment of the present invention may measure and calculate various forms of resources, including electricity, airflow, power, airflow, water pressure and any other measurable resource. An embodiment of the present invention may measure and/or calculate any quantifiable resource from a device and dynamically construct relationships between the device and each of the corresponding devices. Because small changes, errors, and/or variations may have a larger, more substantial impact to the system as a whole, an embodiment of the present invention is able to dynamically adjust the hierarchies in response to any data that may be received in real-time.

At step 320, an update may be performed. As new data is received, the hierarchy of devices may be updated in response to the new data in real-time. According to an embodiment of the present invention, the hierarchies may be adjusted dynamically as data is being received, where the data is not necessarily received in sequence or in any logically order. In fact, the data may be received in any form. An embodiment of the present invention is able to dynamically build the relationships as data is being received and then perform the calculations on-the-fly as the data is being received.

At step 322, reports, alerts and/or other output may be generated. The output may be provided to a user interface on a user device, which may include a computer, mobile device, phone, and/or other interface.

According to an embodiment of the present invention, the system may aggregate devices up the hierarchy and then drill down that hierarchy and identify the status of devices. An embodiment of the present invention may further indicate which devices have capacity, in danger of overcapacity, etc. Also, device status may be graphically illustrated via a user interface, which may be an interactive interface.

Figure 4:
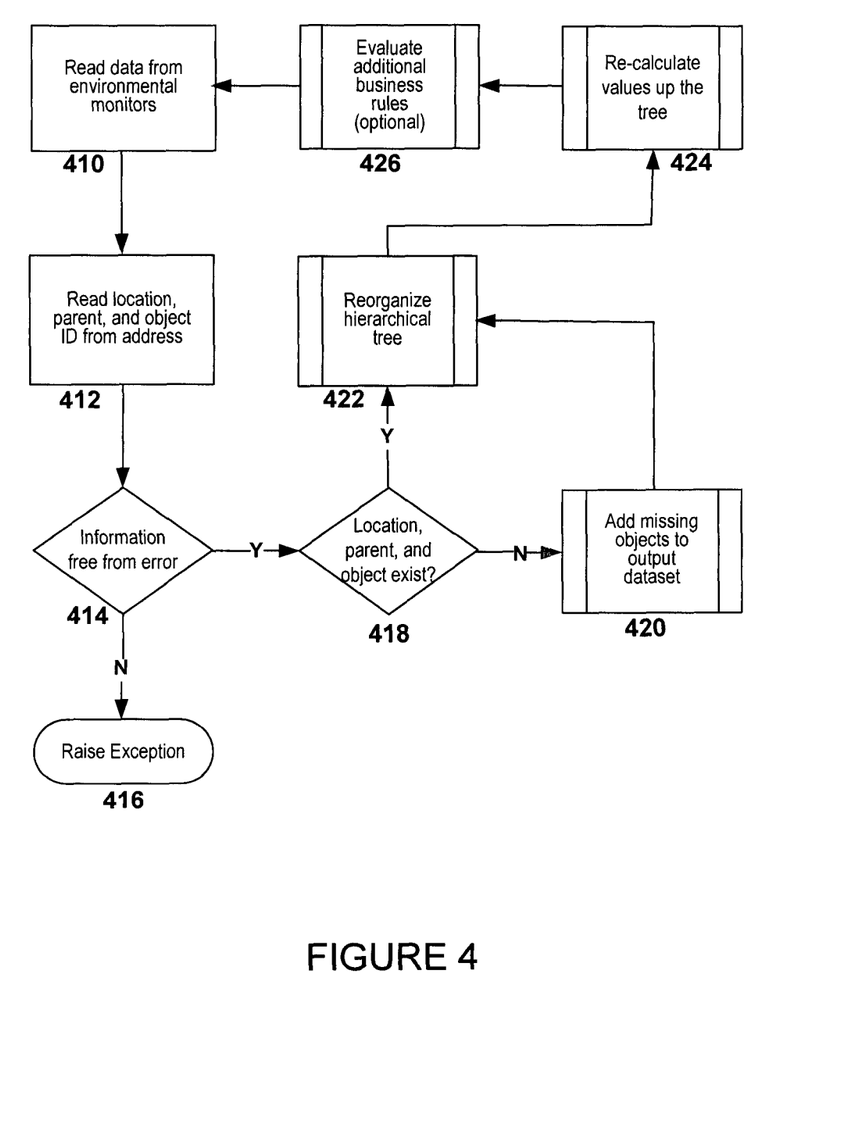
FIG. 4 is an exemplary illustration of a method for applying a device hierarchy, according to an embodiment of the present invention.

FIG. 4 is an exemplary illustration of a method for applying a device hierarchy, according to an embodiment of the present invention. At step 410, data may be read from environmental monitors. The data may also include an address. At step 412, location identifier, parent identifier and object identifier may be read and/or identified from the address. At step 414, it may be determined whether the data read is free from error. At step 416, if the data is not free from error, an exception may be raised. At step 418, it may be determined whether a location, parent and object exists. At step 420, if such does not exist, the missing objects may be added to an output dataset. Otherwise, an hierarchical tree may be reorganized at step 422. At step 424, values up the tree may be re-calculated. At step 426, additional business rules may be evaluated. The order illustrated in FIG. 4 is merely exemplary. While the process of FIG. 4 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 410, data may be read from environmental monitors. The data may also include an address. The data that is being read may be from various parts of a data center where parts may be online or offline. For example, a monitor that was reporting yesterday may stop reporting tomorrow and pick up the following day. Accordingly, the hierarchal tree may be adjusted.

In this exemplary illustration, the addressing scheme of an embodiment of the present invention has been applied to the devices in a facility or data center. As shown at step 410, data may be read from environmental monitoring systems. The applied name may be evaluated where the specific location of the device and the parent device information may be analyzed and the data read may be confirmed. The hierarchal structure may be built on the fly as the data is being read.

For example, a system may read or receive data from a monitoring system or the data may be received via a data feed from a vendor, third party and/or other source. In this example, the data may be received in any format with the unique identifier of an embodiment of the present invention. The data may relate to a value of a measurement of various resources, including electricity, air pressure, water temperature, etc.

At step 412, location identifier, parent identifier and object identifier may be read and/or identified from the address. The data may be in any format and in any order. Using the associated unique address, an embodiment of the present invention may identify a direct parent device (and/or other relationships, associations, affiliations, etc.) and build the structure using that information. Once the structure is developed, an embodiment of the present invention may perform error correcting, summarization, and/or aggregation of downstream values.

At step 414, it may be determined whether the data read is free from error. An embodiment of the present invention may implement an error detection function that recognizes that one or more errors are a possibility. Various methods or functions for detecting potential (or a likelihood) error may be implemented. Whether the data contains an error may be dependent on various factors, data, preferences, etc. At step 416, if the data is not free from error, an exception may be raised.

An embodiment of the present invention is directed to receiving monitoring data from devices and then dynamically generating system hierarchies. For example, a meter reading may indicate three amps. However, only 2.6 amps may be used. Accordingly, an error correction process may be applied. This may be applied at each node, or each device. For example, this may occur when an item is introduced in that stream, from a surge protector to a Remote Power Tower (RPT) to a Power Distribution Unit (PDU) to the Uninterruptable Power Supply (UPS) to the power company. Thousands of data points may get continuously recalculated. Accordingly, there is a relationship between anything in a power tree. If a device is added, removed and/or modified, there are microscopic value changes to devices, systems, etc.

In isolation these differences may not seem important, however, in the aggregate, the differences may be substantial. This is particularly important when performing capacity planning and/or power planning. For example, a minute change at a bottom level (e.g., a user blows a capacitor) may affect all the devices up the chain.

At step 418, it may be determined whether a location, parent and object exists. For example, this step may determine whether a node/device/object exists in the hierarchy for the received data.

At step 420, if such does not exist, the missing objects may be added to an output dataset. Otherwise, an hierarchical tree may be reorganized at step 422.

At step 424, values up the tree may be re-calculated. According to an embodiment of the present invention, the hierarchy may be rebuilt and recalculated as new nodes in that tree are added, removed and/or modified. For example, the hierarchy encompasses all of the known objects within a system. Some systems may include multiple levels, for example, a company may require four levels deep of different type of infrastructure devices. Another entity may be three levels deep. As the data center physically changes, an embodiment of the present invention may reconfigured the hierarchy and the relationships between/among the devices.

At step 426, additional business rules may be evaluated and/or applied. For example, business rules may identify that a device, such as a PDU, disappeared and whether that was on purpose or whether the device simply stopped recording. Business rules may also identify potential scenarios, e.g., a circuit may be overloading in a particular area based on the information that is being received. Business rules may identify that the water pressure in a particular pipe is too high or too low.

Figure 5:
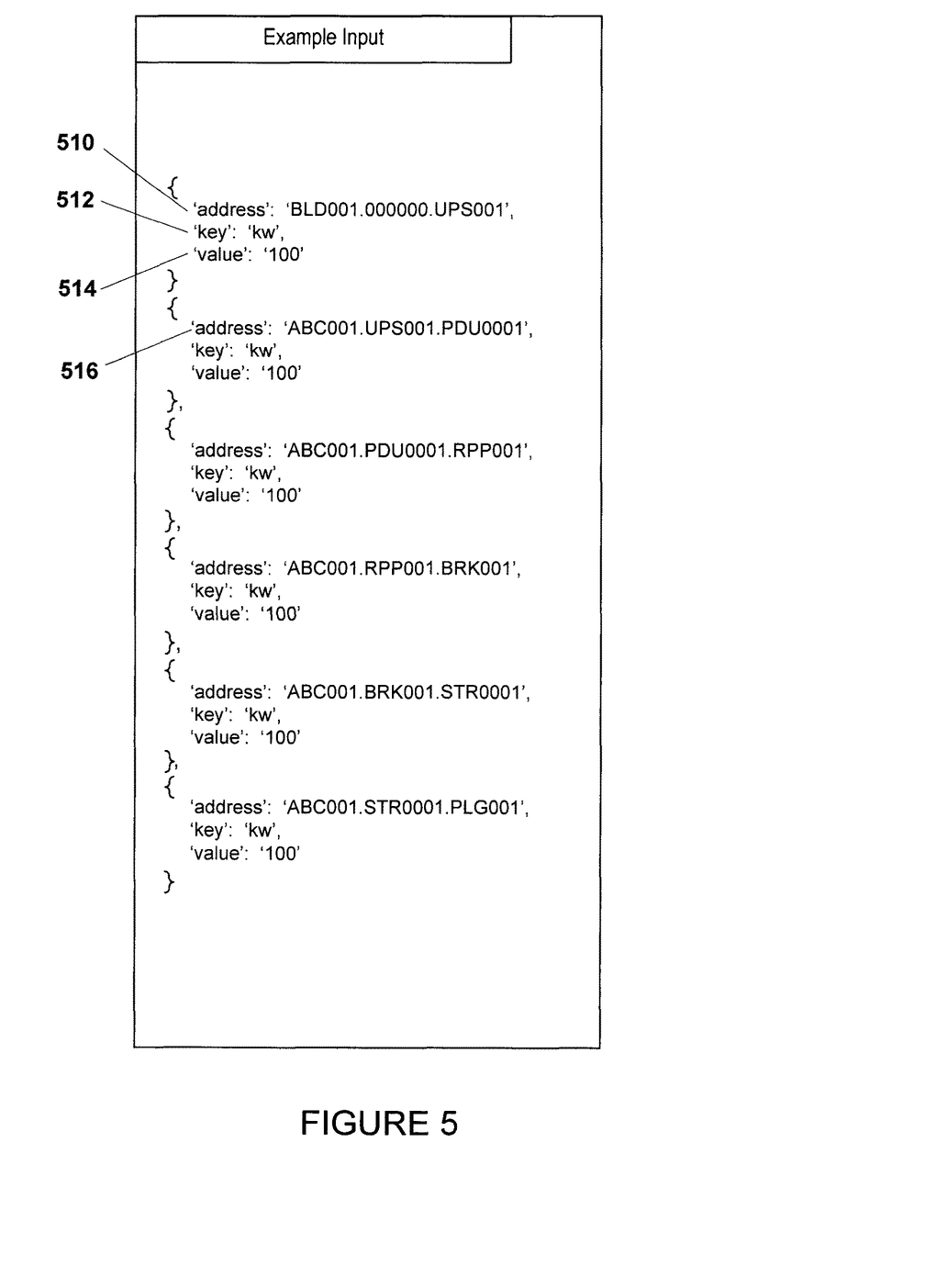
FIG. 5 is an exemplary illustration of an input, according to an embodiment of the present invention.

FIG. 5 is an exemplary illustration of an input, according to an embodiment of the present invention. In the exemplary input illustrated in FIG. 5, a device may be identified by an address 510, represented by "BLD001.000000.UPS001." The key 512 may represent the type of measurement and the corresponding value may be shown at 514. In this example, the key is "kw" and the value is "100." As shown in FIG. 5, the illustrated devices are all in location "ABC001," as shown by 516. The lowest level device is shown at PLG001 and the highest level device is shown at UPS001 in the location. The intermediate devices are shown in between, each with a dependency on a preceding device.

FIG. 6 is an exemplary illustration of an output, according to an embodiment of the present invention. In the exemplary output illustrated in FIG. 6, location UUID is "BLD001" which represents building 001, as shown by 610. Reported Data 612 may include measurements from remote devices, as shown by "kw" and "kva" measurements. This data may be supplied directly from a remote system or device, such as a meter, etc. Calculated Data 614 may represent aggregated data from child objects, as shown by "kw," "kva" and "amps." Children may represent child objects 616, following the same format as the parent. Object LUID may be shown by "UPS001," at 618. Calculated values from other child objects that are not represented in this example, these new keys/values will bubble up to all parent objects.

In the example of FIG. 6, the children devices are shown. The exemplary building has Uninterruptable Power Supply (UPS) units with reported and calculated data. The UPS unit has additional children devices. The exemplary building also has a power distribution unit (PDU) with reported and calculated data, which also has additional children devices. Additional devices may include Remote Power Tower (RPT), etc.

FIG. 6 is an exemplary illustration of what was dynamically calculated based off of the downstream and upstream activity. For example, there may be a situation when a meter fails and starts reporting zeros, or is otherwise malfunctioning or providing inaccurate readings/information. This may be difficult to detect, especially if the device was drawing a low level of power. If the reading is only accurate within two amps then everything in the facility may float between two amps off the tree. This may result in 100, or even 1000 in the aggregate. An embodiment of the present invention is able to identify what a device is reading and what the device is actually calculating.

According to an exemplary scenario, a new facility may be in the process of being built. The highest level of the tree and the lowest level of the tree may be initially implemented. Other devices may be introduced to the tree at a later time. By adding new devices, the values of the other devices will be affected. In addition, the manner in which the values need to be summarized and aggregated may also change. Instead aggregating at two levels, the aggregation may be performed at four levels, etc. For example, a building manager who needs to understand capacity constraints may need to view data at the highest level, which is not very valuable to them, but also the distribution parts in the middle levels. According to another example, a site engineer who works directly with servers and/or other hardware and devices may be most interested in the lowest level. Also, a finance group may be most interested in the very top level because to assess what is owed to a power company and/or other third parties. If the aggregation is not accurate, information may be misrepresented to those different parties.

Because there may be variation in every building, every time a new facility is implemented or a facility is closed down and moved to another facility, there are legacy problems. An embodiment of the present invention provides the ability to understand devices within a building and each device's associations, any update or change may be incorporated dynamically.

While the exemplary embodiments illustrated herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Databases (which may include datacenters and other storage devices) may comprise or interface with a searchable database. Databases may comprise, include or interface to a relational database. Other databases, such as a query format database, a Standard Query Language (SQL) format database, a storage area network (SAN), or another similar data storage device, query format, platform or resource may be used. Databases may comprise a single database or a collection of databases, dedicated or otherwise. In one embodiment, Databases may store or cooperate with other databases to store the various data and information described herein. In some embodiments, Databases may comprise a file management system, program or application for storing and maintaining data and information used or generated by the various features and functions of the systems and methods described herein. In some embodiments, Databases may store, maintain and permit access to customer information, transaction information, account information, and general information used to process transactions as described herein. In some embodiments, Databases is connected directly to a processor, which, in some embodiments, it is accessible through a network, such as communication network, for example.

Communications network may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

Communications network may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 210 and 212 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network may comprise a satellite communications network, such as a direct broadcast communication system (DBS) having the requisite number of dishes, satellites and transmitter/receiver boxes, for example. Communications network may also comprise a telephone communications network, such as the Public Switched Telephone Network (PSTN). In another embodiment, communication network may comprise a Personal Branch Exchange (PBX), which may further connect to the PSTN.

In some embodiments, processor(s) may include any terminal (e.g., a typical home or personal computer system, telephone, personal digital assistant (PDA) or other like device) whereby a user may interact with a network, such as communications network, for example, that is responsible for transmitting and delivering data and information used by the various systems and methods described herein. Processor(s) may include, for instance, a personal or laptop computer, a telephone, or PDA. Processor(s) may include a microprocessor, a microcontroller or other general or special purpose device operating under programmed control. Processor(s) may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. Processor(s) may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). Processor(s) may also include a network-enabled appliance, a browser-equipped or other network-enabled cellular telephone, or another TCP/IP client or other device.

As described above, the system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

Although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

What is claimed is:

1. A system for dynamically building system hierarchies, the system comprising:
    an electronic input configured to receive monitoring data from a plurality of devices associated with an entity, wherein the monitoring data for each device of the plurality of devices comprises a unique addressing scheme, the unique addressing scheme comprising a location identifier, a relationship identifier and an object identifier for each device, the relationship identifier identifies a related object and comprises one of: a child object identifier, a peer object identifier and a parent object identifier;
    a server comprising a programmed computer processor configured to dynamically build a system hierarchy based on the addressing scheme for each device responsive to the monitoring data and a calculated data determined for each device and the programmed computer processor is further configured to automatically revise the system hierarchy in response to real-time change data, wherein the monitoring data comprises measurements from each device and the calculated data represents aggregated downstream and upstream activity; and
    a user interface, coupled to the server, configured to generate and graphically display the system hierarchy.

2. The system of claim 1, wherein the processor compares the monitoring data and the calculated data for each device to determine an error event.

3. The system of claim 1, wherein the input receives monitoring data from the plurality of devices in real time and with each update in the monitoring data, the processor dynamically updates the system hierarchy.

4. The system of claim 1, wherein the input receives monitoring data from a plurality of locations.

5. The system of claim 1, wherein the unique addressing scheme comprises a base 36 number for each identifier.

6. The system of claim 1, wherein the object identifier comprises a plurality of sub-ranges, each sub-range corresponding to a category of devices.

7. The system of claim 1, wherein the monitoring data is from one or more environmental monitors.

8. The system of claim 1, wherein a device of the plurality of device comprises an object that produces a resource.

9. The system of claim 1, wherein a device of the plurality of device comprises an object that consumers a resource.

10. A method for dynamically building system hierarchies, the method comprising the steps of:
    receiving, via an electronic input, monitoring data from a plurality of devices associated with an entity, wherein the monitoring data for each device of the plurality of devices comprises a unique addressing scheme, the unique addressing scheme comprising a location identifier, a relationship identifier and an object identifier for each device, the relationship identifier identifies a related object and comprises one of: a child object identifier, a peer object identifier and a parent object identifier;
    dynamically building, via a server comprising a programmed computer processor, a system hierarchy based on the addressing scheme for each device responsive to the monitoring data and a calculated data determined for each device;

automatically revising, via the server comprising the programmed computer processor, the system hierarchy in response to real-time change data, wherein the monitoring data comprises measurements from each device and the calculated data represents aggregated downstream and upstream activity; and generating and graphically displaying, via a user interface coupled to the server, the system hierarchy.

11. The method of claim 10, wherein the relationship identifier identifies a parent object of a current object.

12. The method of claim 10, wherein the processor compares the monitoring data and the calculated data for each device to determine an error event.

13. The method of claim 10, wherein the input receives monitoring data from the plurality of devices in real time and with each update in the monitoring data, the processor dynamically updates the system hierarchy.

14. The method of claim 10, wherein the input receives monitoring data from a plurality of locations.

15. The method of claim 10, wherein the unique addressing scheme comprises a base 36 number for each identifier.

16. The method of claim 10, wherein the object identifier comprises a plurality of sub-ranges, each sub-range corresponding to a category of devices.

17. The method of claim 10, wherein the monitoring data is from one or more environmental monitors.

18. The method of claim 10, wherein a device of the plurality of device comprises an object that produces a resource.

19. The method of claim 10, wherein a device of the plurality of device comprises an object that consumers a resource.

* * * * *